United States Patent
Wellard

(10) Patent No.: US 6,615,533 B2
(45) Date of Patent: *Sep. 9, 2003

(54) ICE FISHING NET

(76) Inventor: Clark Wellard, 1379 City Creek Rd., Pocatello, ID (US) 83204

(*) Notice: Subject to any disclaimer, the term of this patent is extended or adjusted under 35 U.S.C. 154(b) by 0 days.

This patent is subject to a terminal disclaimer.

(21) Appl. No.: 10/162,142

(22) Filed: Jun. 3, 2002

(65) Prior Publication Data

US 2003/0000125 A1 Jan. 2, 2003

Related U.S. Application Data

(63) Continuation of application No. 09/677,541, filed on Oct. 2, 2000, now Pat. No. 6,412,213.

(51) Int. Cl.[7] .............................................. A01K 77/00
(52) U.S. Cl. ........................................................ 43/12
(58) Field of Search ............................................ 43/12

(56) References Cited

U.S. PATENT DOCUMENTS

| | | |
|---|---|---|
| 3,289,850 A | 12/1966 | Gubash |
| 3,595,001 A | 7/1971 | Shumaker |
| 3,722,940 A | 3/1973 | Misjak |
| 3,857,787 A | 12/1974 | Kinne |
| 3,872,831 A | 3/1975 | Cassidy |
| D263,512 S | 3/1982 | Kawada |
| 4,335,678 A | 6/1982 | Garza et al. |
| 4,663,995 A | 5/1987 | Amundson et al. |
| 4,835,955 A | 6/1989 | Gaubis |
| 4,866,872 A | 9/1989 | Guibault et al. |
| 5,024,757 A | 6/1991 | Malak |
| 5,072,538 A | 12/1991 | Hendricks et al. |
| 5,140,767 A | 8/1992 | Traut |
| 5,347,800 A | 9/1994 | Morgan |
| D375,782 S | 11/1996 | Rackley |
| D376,742 S | 12/1996 | Filowiak et al. |
| 6,412,213 B1 * | 7/2002 | Wellard .......................... 43/12 |

FOREIGN PATENT DOCUMENTS

WO  WO 94/07362  4/1994

* cited by examiner

Primary Examiner—Charles T. Jordan
Assistant Examiner—Jordan M Lofdahl
(74) Attorney, Agent, or Firm—Morriss O'Bryant Compagni, P.C.

(57) ABSTRACT

An ice fishing net comprises an elongate handle having a gripping portion for grasping by a user and a net rim assembly attached to the handle. The net rim assembly includes first and second semicircular rim members with the first rim member fixedly mounted relative to the handle and the second rim member rotatably mounted relative to the first rim member and rotatable from a first position to a second position to form a substantially circular rim. A trigger assembly selectively allows the second rim member to rotate from a first position to a second position. Netting material is secured to the first and second rim members to form a net for receiving a fish therein when the second rim member is its second position. A biasing device forces the second rim member from the first position to the second position when released by the trigger assembly.

20 Claims, 8 Drawing Sheets

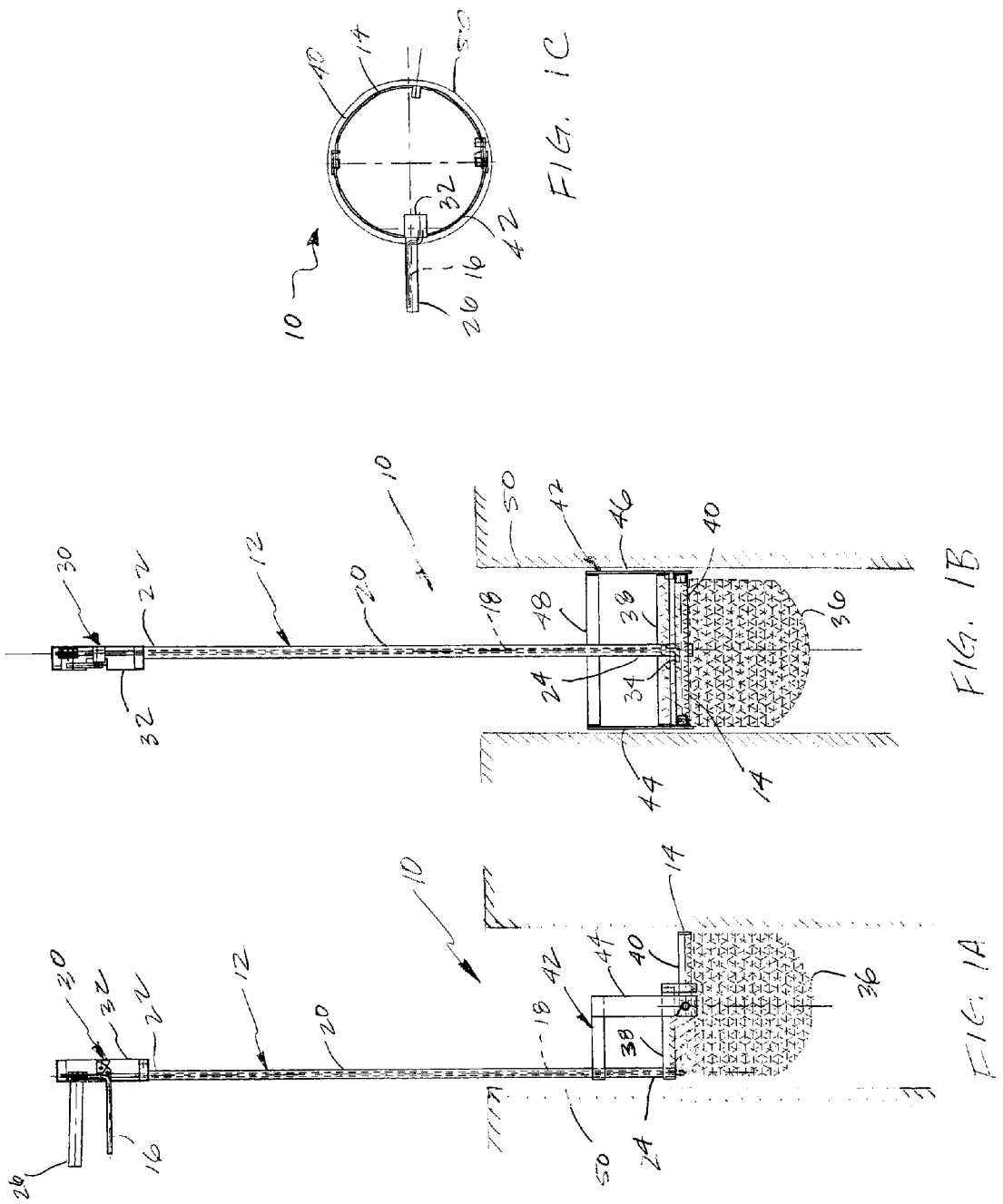

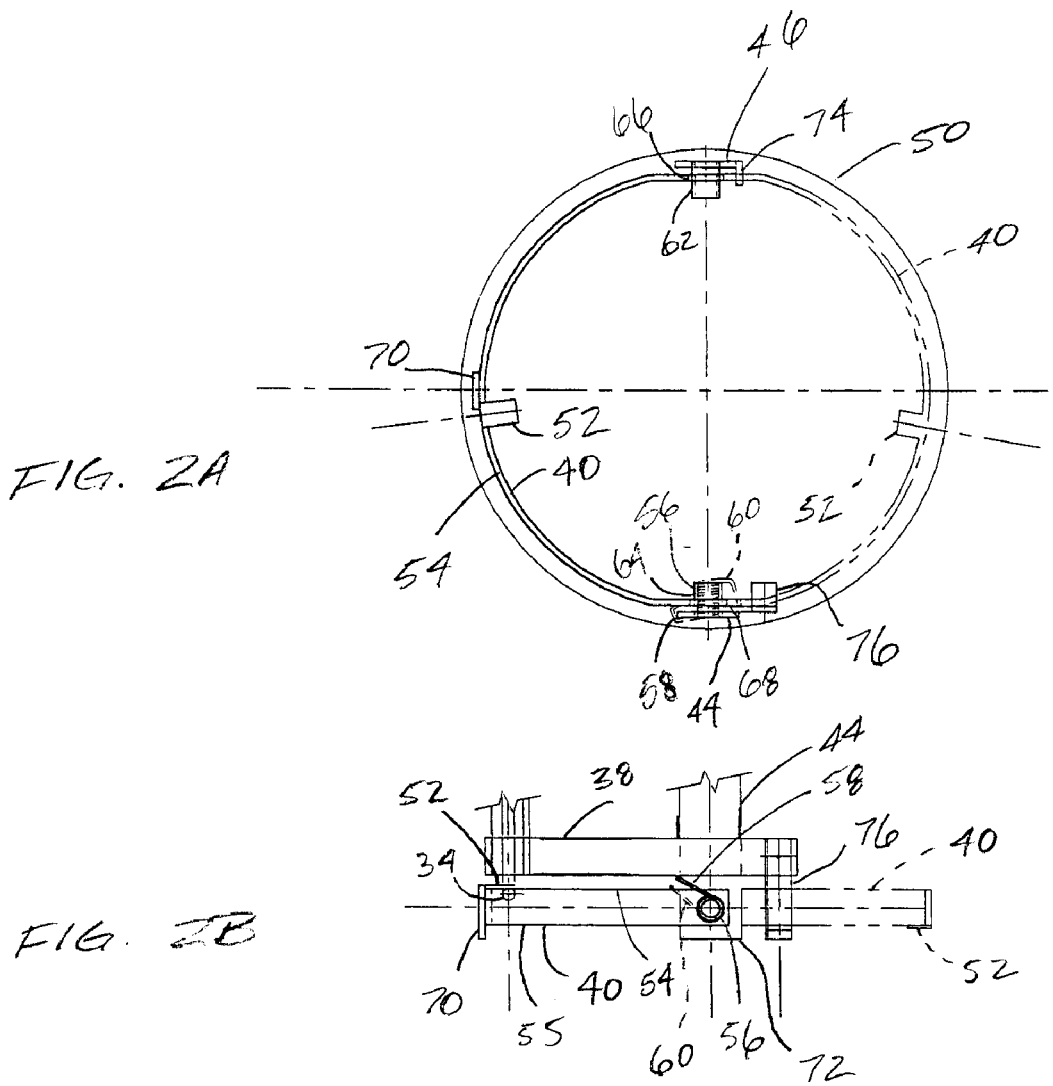

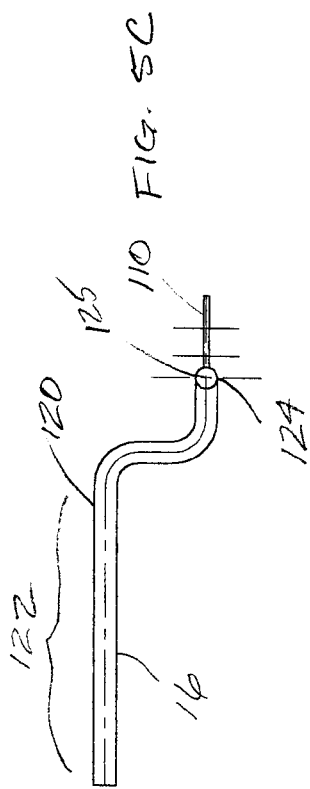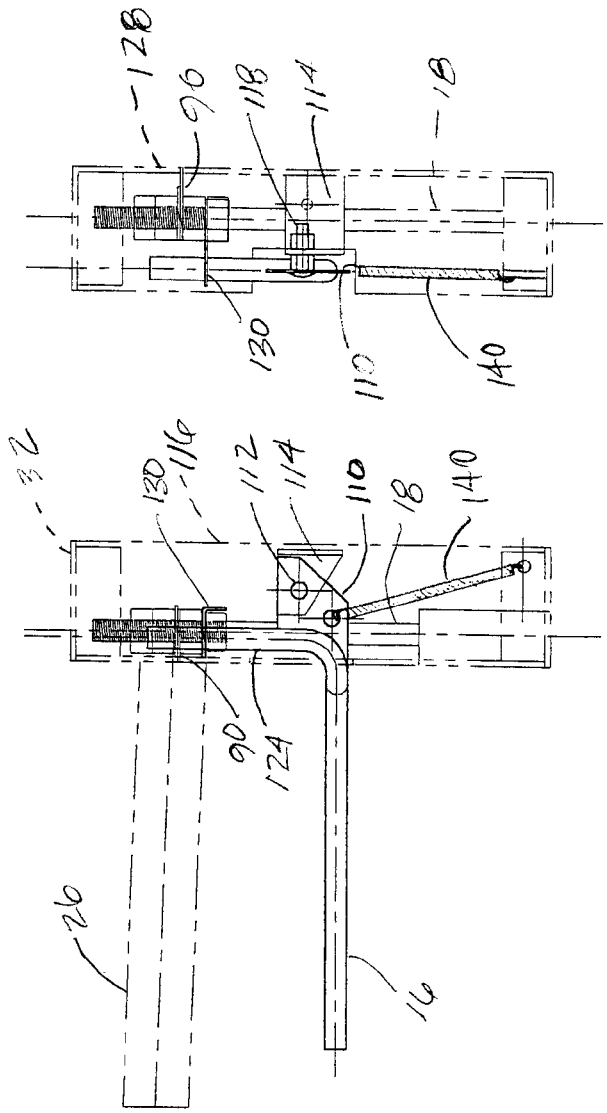

ICE FISHING NET

CROSS-REFERENCED TO RELATED APPLICATIONS

This application is a continuation of and claims priority to co-pending U.S. patent application Ser. No. 09/677,541, filed on Oct. 2, 2000, now U.S. Pat. No. 6,412,213.

BACKGROUND

1. Field of the Invention

The field of the invention relates generally to nets used for recreational fishing, and more specifically, to a fishing net configured for use when ice fishing to retrieve fish from a hole that has been bored through a layer of ice that has formed on a lake or other body of water.

2. Background of the Invention

Ice fishing is becoming more and more popular among avid fisherman in the United States and Canada where the climate permits such activity during the winter months. Ice fishing has become a popular leisure activity for many men and women, commonly collectively referred to as anglers, who enjoy fishing during the warmer months and desire to fish when the weather turns cold and lakes and reservoirs freeze. Such fishing conditions, however, present their own unique problems and challenges.

A typical setup for an ice fishing angler includes a fishing pole to which a reel containing fishing line is attached. The line is fed through several eyelets attached to the length of the pole at spaced intervals. To the free end of the line, an angler will attach a lure or a hook and attach bait to the hook. In order to access the depths of a frozen pond or lake and thus to get the lure or bait to the fish, the angler must drill or have drilled a hole through the layer of ice. The hole must be of sufficient diameter to not only enter the bait or lure into the water but to retrieve any fish that may be caught. As such, typical hole diameters are 6, 8 or 10 inches. Once the hole is drilled through the ice, the angler can lower the bait or lure through the hole and into the water.

Once a fish is caught, the fish must be retrieved through the hole. Such a feat is often difficult as it is usually necessary to maintain proper tension on the line so that it does not exceed the breaking strength of the line or allow slack in the line which may allow the fish to free itself from the hook (especially when barbless hooks are used). In addition, once the fish leaves the water, the weight of the fish alone may exceed the breaking strength of the line. As such, anglers typically employ a retrieving device, such as a hand held net, to help retrieve the fish once it has been brought to within reaching distance of the angler. With respect to ice fishing, such nets must be configured to fit within the ice fishing hole. The hole itself is typically a cylindrically shaped bore extending one or more feet through the ice, depending on the thickness of the ice. As such, typical fishing nets which have sizes larger than the ice fishing hole are not useful as their size prevents them from being inserted into the hole. Furthermore, smaller nets that may be insertable into the ice fishing hole are not configured to fill the entire diameter of the hole to prevent a fish from falling between the wall of the ice fishing hole and the frame of the fishing net.

When ice fishing, an angler typically employs the use of a gas powered auger which is capable of boring a hole into the ice. As such, the hole will have a diameter corresponding to the diameter of the auger used. As discussed, such augers come standard in sizes ranging from about six inches in diameter to ten inches in diameter. Because the fishing hole often has a standard diameter and most anglers utilize a single auger having a particular size, it is possible to configure an ice fishing net for fitting within a particular diameter ice hole. For example, in U.S. Pat. No. 4,866,872, an apparatus for retrieving fish caught while ice fishing is disclosed in which a support member is mounted to a base member that is supported by the upper surface of an ice layer. The support member is extended and retracted through the ice hole and is operative to support a fish during such motion. An extension and retrieval mechanism, such as a slide rod interconnecting the base and support member whereby a fish caught on a fishing line may be maneuvered to the ice hole, and onto the support member and supported during upward movement through the ice hole. The support member may be pivoted out of alignment with the ice hole so as not to obstruct the lower opening thereto, and biased against the ice layer lower opening thereto, and biased against the ice layer lower surface in a ready position. An adjustable limit stop accommodates ice layers of varied thicknesses. The base member is preferably a circular collar, and the support member a pan element with drain holes. A major problem with the foregoing apparatus for retrieving fish while ice fishing is that the pan must be inserted below the ice layer and thus must include a sufficiently long handle to extend a required amount into the ice hole. Furthermore, the device can only be used in one hole as the device is mounted to the ice layer. Additionally, when used in lakes where the depth of the ice may be several feet, the size of the device may become cumbersome to maneuver and operate. Moreover, the ability of the fisherman to both hold tension in the fishing line while retrieving the fish and to maneuver the device is likely to be quite difficult.

A similar device is disclosed in U.S. Pat. No. 3,722,940 in which a stationary tube is attached along a side of the hole in the ice supports a rod having a handle at its upper end and a horizontal gate plate at its lower end. The rod is pivotable by the handle so as to swing the gate into a closed position at the bottom end of the hole, and the plate is then movable upwardly so to bring the fish to the top end of the hole in the ice. As with the aforementioned patent, the device of the U.S. Pat. No. 3,722,940 patent requires the device to be secured to the ice hole and extend to the bottom of the layer of ice.

Several other ice nets and ice skimmers have been developed that do not require the device to be lowered below the layer of ice. In the alternative, devices such as those disclosed in U.S. Pat. Nos. 3,289,850, 3,856,787 and 5,140,767 teach the use of a plate or scoop that can be actuated to a closed position once the device is lowered into the ice hole. U.S. Pat. No. 3,289,850 discloses an ice skimmer in which the skimmer is pivotally connect to a handle. Because it is often desirable to remove ice that forms in the ice hole, ice skimmers are used to keep the ice hole clear for easier fish removal. The skimmer shown in U.S. Pat. No. 3,289,850 is lowered into the ice hole with the skimmer lying against the handle. Once the skimmer is lowered and the handle is pulled upwardly out of the ice hole, it is intended that the skimmer will open to fill the hole to remove ice in the ice hole.

A similar device is shown in U.S. Pat. No. 3,857,787 in which an ice skimmer includes a mechanically actuated skimmer. The skimmer of U.S. Pat. No. 3,857,787 employs the use of an handle which can be actuated to manipulate the skimmer. Thus, once lowered into the ice hole in a vertical position, the skimmer can be rotated to a horizontal position and then lifted to remove the ice from the ice hole.

The ice net of U.S. Pat. No. 5,140,767 operates similarly to the skimmer of U.S. Pat. No. 3,857,787 in that an actuatable handle is utilized to close the ice net once a fish is positioned above a scoop in the ice hole. In the open position (i.e., when the scoop is in a vertical position), the scoop will necessary obstruct a substantial portion of the ice hole. That is, for a scoop having a diameter close to the diameter of the ice hole, the scoop will necessarily be positioned away from the side wall of the ice hole thus reducing the effective diameter of the hole as the ice net is lowered pass the fish. As the fish is typically moving to try to free itself, the lower end of the ice scoop can actually impinge upon the fish at the point of the hook and dislodge the hook from the fish thus freeing the fish.

Accordingly, it would be advantageous to provide an ice fishing net that does not have to be inserted into an ice hole completely through the layer of ice to be operable. It would also be advantageous to provide an ice fishing net that provides little obstruction in the ice hole when inserted therein so that the net can pass by a fish in an ice hole held on a line by an angler without dislodging the fish from the line. It would still be a further advantage to provide an ice fishing net that is operable with one hand so that the angler can hold a fishing pole with one hand and maneuver and operate the fishing net with the other hand. These and other advantages will become apparent from a reading of the following description of the preferred embodiments of an ice fishing net in accordance with the principles of the present invention.

SUMMARY OF THE INVENTION

It is an object of the present invention to provide an ice fishing net that is capable of retrieving a fish from a hole that has been formed in the ice by an angler when ice fishing.

It is another object of the present invention to provide an ice fishing net that does not substantially obstruct the ice hole when used by an angler to retrieve a fish from the ice hole when ice fishing.

It is yet another object of the present invention to provide an ice fishing net that can be operated with one hand by an angler to retrieve a fish from the ice hole when ice fishing.

It is still another object of the present invention to provide an ice fishing net that simple to operate and relatively lightweight.

It is yet another object of the present invention to provide an ice fishing net that is self actuating.

It is still another object of the present invention to provide an ice fishing net that is self supporting in a standing position.

Another object of the present invention is to provide an ice fishing net that can service multiple holes.

Yet another object of the present invention is to provide an ice fishing net that can enter the hole while the fish is in the hole, bypass the fish and prevent the fish from exiting the bottom of the hole.

Still another object of the present invention is to provide an ice fishing net that does not require the angler to put his or her hands in the water.

In accordance with these and other objects herein discussed, as well as those that will be understood to one of skill in the art upon review of the present invention, an ice fishing net in accordance with the principles of the present invention comprises an elongate handle having a distal end and a proximal end and a net assembly connected to the handle proximate the distal end. The net assembly has a first rim portion fixedly mounted relative to the handle, a second rim portion pivotally mounted relative to the first rim portion, and a net supported by the first and second rim portions. The second rim portion is biased to rotate from a first position to a second position. A trigger assembly is connected to the handle and linked to the second rim portion for holding the first rim portion in the first position and for selectively releasing the first rim portion to allow it to rotate from the first position to the second position.

The handle preferably comprises an elongate tube. The trigger assembly preferably comprises a release lever coupled to an elongate rod within the elongate tube. The rod has a proximal end coupled to the release lever for rotation of the rod and a distal end having a release arm for grasping the second rim portion when the second rim portion is in the first position.

In another preferred embodiment, the elongate handle is comprised of a tube and has a first portion having a first longitudinal axis and a second portion having a second longitudinal axis. The first longitudinal axis and the second longitudinal axis have an angle between them such that a bend is formed in the handle for easier single handed use by an angler.

The trigger assembly preferably includes a biasing member coupled to a slidable member within the handle for biasing the slidable member toward the proximal end of the handle. A release pin is inserted through a hole in the handle and is capable of holding the slidable member away from the proximal end of the handle. Releasing the pin, releases the slidable member to allow the slidable member to slide toward the proximal end of the handle as it is pulled by the biasing member. A cable, wire or other such member is coupled between the second rim portion and the slidable member so that movement of the slidable member toward the proximal end of the handle rotates the second rim portion to the second position.

The first rim portion and the second rim portion preferably have semicircular configurations with similar radii. The radii are less than a radius of an ice hole in which the ice fishing net is to be used while substantially encircling the an ice hole when the second rim portion is in the second position. Such a configuration substantially fills the ice hole to prevent a fish from escaping between the net and the ice hole while not interfering with operation of the ice fishing net.

The ice fishing net also preferably includes a rim retaining member depending from the second rim portion positioned for engagement with the release arm when the second rim member is in the first position.

In yet another preferred embodiment, the ice fishing net includes an abutment member fixedly secured relative to the first rim member to prevent over rotation of the second rim member when the second rim member swings from the first position to the second position.

In still another preferred embodiment, the fishing net including a rim engaging member for holding the second rim member in the second position so that the second rim portion does not sag from the weight of a captured fish.

In yet another preferred embodiment, the fishing net includes a spring coupled to the second rim member for forcing the second rim member from the first position to the second position.

In another preferred embodiment, the fishing net includes a first frame member and a second frame member each fixedly mounted relative to the first rim portion. The second rim portion is pivotally mounted to and between the first frame member and the second frame member. A leg member depends from the second rim member so that when the second rim member is in the first position, the leg member and the first and second frame members are capable of supporting the handle in a standing position.

BRIEF DESCRIPTION OF THE ILLUSTRATIONS

In the drawings, which illustrate what is currently considered to be the best mode for carrying out the invention:

FIG. 1A is a side view of a first preferred embodiment of an ice fishing net in accordance with the principles of the present invention;

FIG. 1B is a front view of the ice fishing net illustrated in FIG. 1A;

FIG. 1C is a top view of the ice fishing net illustrated in FIGS. 1A and 1B;

FIG. 2A is a top view of a net assembly for an ice fishing net in accordance with the principles of the present invention;

FIG. 2B is a side view of the net assembly illustrated in FIG. 2A;

FIG. 5A is a side view of a portion of a first preferred embodiment of a handle/trigger assembly in accordance with the principles of the present invention;

FIG. 5B is a front view of the handle/trigger assembly illustrated in FIG. 5A;

FIG. 5C is a not view of a first preferred embodiment of the release lever illustrated in FIG. 5A;

DETAILED DESCRIPTION OF THE INVENTION

Figures 3A, 3B:
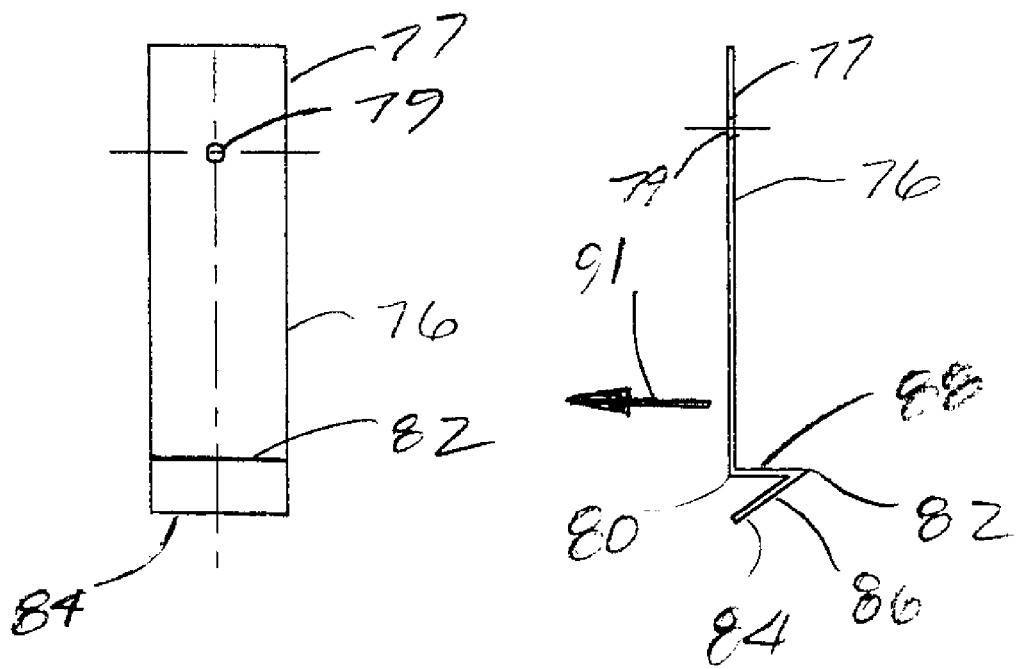
FIG. 3A is a front view of a rim retaining member in accordance with the principles of the present invention.
FIG. 3B is a side view of the rim retaining member of FIG. 3A.

FIGS. 1A, 1B and 1C show side, front and top views, respectively, of a first preferred embodiment of an ice fishing net, generally indicated at 10, in accordance with the principles of the present invention. The net 10 is comprised of a handle portion 12 and a net portion 14. The handle portion 12 includes a release lever 16 that is configured to rotate a rod 18 and allow the net portion 14 to spring into an open position as is shown in FIG. 1A.

The handle portion 12 is comprised of an elongate substantially rigid tube 20 having a proximal end 22 and a distal end 24. A gripping handle 26 is substantially perpendicularly attached relative to the tube 20 to provide a handle for gripping with one hand by an angler. The gripping handle 26 is used in combination with the release lever 16 to cause actuation of the net portion 14. That is, the release lever 16 can be pulled toward the gripping handle 26 to release the net portion 14. The release mechanism, generally indicated at 30 is housed within the housing 32 and comprises the release lever 16 which is pivotally connected relative to the housing 32, the rod 18 and a release arm 34 (see FIG. 1B) as will be described in more detail herein.

The net portion 14 is comprised of a netting material 36 which is mounted to first and second rim portions 38 and 40. The netting material 36 may be attached to the rim portions 38 and 40 as with an elongate segment of webbing material interwoven through the netting material 36 and secured to the rim as with rivets or other types of fasteners known in the art. For the rim portion 40, the netting material 36 may be threaded directly onto the rim portion 40 so that the top edge of the netting material 36 engages the rim portion 40. The first rim portion 38 is fixedly mounted relative to the tube 20 and the second rim portion 40 is pivotally mounted relative to the first rim portion 24. The second rim portion 40 is illustrated in an open position, that is, in a position in which the net is open to receive a fish therein. When in the open position, the first and second rim members, 38 and 40, respectively, form a hoop preferably having a diameter near the diameter of the ice hole 50 that is being fished. Of course, those of skill in the art will appreciate that the diameter of the hole 50 may be greater than the diameter of the hoop formed by the first and second rim members, 38 and 40 respectively, and still be effective in retrieving a fish from an ice hole 50. Having the hoop diameter close to the diameter of the ice hole 50, however, reduces the possibility that a fish could fit between the hoop formed by the first and second rim members 38 and 40 and the wall of the ice hole 50.

To provide additional support for the first rim member 38, a support frame 42 is attached to and between the first rim member 38 and the tube 20. The frame 42 is comprised of first and second upright frame members 44 and 46, respectively, and semicircular frame member 48 which is spaced above the first rim member 38 and attached to the tube 20. The support frame 42 helps to prevent the first and second rim members 38 and 40 from pivoting relative to the distal end 24 of the tube 20 when a fish is contained in the net 36.

FIGS. 2A and 2B illustrate top and side views of the rim members 38 and 40 relative to an ice hole 50. The rim member 40 is rotatable between a first position (indicated in solid lines) and a second position (indicated in dashed lines). When the rim member 40 is in a first position, the release arm 34 can be rotated so as to retain the rim member 40 in the first position by resting against a first rim retaining member 52 which depends from the rim member 40 and extends inwardly therefrom at a first side 54 thereof. In the first position, the rim member 40 is biased away from the rim member 38 as with a biasing member 56. The biasing member may comprise a coil spring secured relative to the point of rotation of the rim member 40. As such, the biasing member 56 includes a first arm 58 which abuts against the frame member 44 and a second arm 60 which abuts against the first side 54 of the rim member 40 so as to swing the rim member 40 from its first position to its second position. As such, when the release arm 34 is rotated from a first position as shown in FIG. 2B to a second position (i.e., rotated inwardly) so that the retaining member 34 no longer engages the rim retaining member 52, the rim member 40 will swing from the first position to the second position.

When the rim 40 is in the first position, the rim members 38 and 40 are substantially concentric and have substantially similar diameters. As such, with the net 36 attached (se FIG. 1A) the net will only lie in half of the ice hole 50 and the net will hang against one half of the side wall of the ice hole 50. When the rim member 40 is in the second position, the rim members 38 and 40 form a circular rim member that substantially fills the ice hole. With the net 36 attached, it would be quite difficult for a fish to fit between the rim members 38 and 40 and the ice hole 50.

As further illustrated in FIGS. 1A and 1B, the rim member 40 is pivotally attached to the rim member 40 as with hollow cylindrical post members 62 and 64. The rim member 40 is provided with circular bores 66 and 68, respectively, for fitting over and pivotally attaching relative to the post members 62 and 64. The coil spring 56 is positioned within the cylindrical post 68 and is retained therein with the arm members 58 and 60 which extend out from the cylindrical post 68.

In order to form a free standing fisting net 10, a rear standing member or leg 70 is attached to the rim 40 near its longitudinal center. The leg 70 is attached so as to have a length substantially equal to the distance between the second side 55 and the distal end 72 of the frame member 44. As such, the distal ends of the frame members 44 and 46 (see FIG. 1B) and the leg 70 form three legs or a tripod for supporting the net 10 in a free standing position. Thus, when the rim member 40 is loaded, i.e., held in its first position, the net 10 can be stood next to the ice hole for quick access by an angler when the net 10 is needed.

When the rim member 40 swings to its second position, an abutment member 74 which is rigidly attached to the frame member 46 prevents the rim member 40 from swinging past a horizontal position. That is, because the biasing device 56 encourages the rim member 40 to rotate away from the rim member 38 from a first position to a second position and because it is desirable that when the rim member 40 is in its second position the effective diameter of the first and second rim members 38 and 40 be maximized, the abutment member 74 prevents the rim member 40 from over rotating. In addition, when the rim member 40 rotates to the second position, the force of the biasing device 56 would have to be sufficiently strong enough to not only support the weight of the rim member 40 in its second position but a fish contained in the net. Accordingly, a rim engaging member 76 is provided to prevent the rim member 40 from rotating back toward the first position after the rim member 40 has rotated to the second position.

Referring now to FIGS. 3A and 3B, the rim engaging member 76 is comprised of an elongate plate that is formed from a flexible material such as a sheet of spring steel. The rim engaging member 76 is attache to the rim member 38 (see FIG. 2B) proximate its proximal end 77 as with bore 79 and a fastener as is known in the art for attaching such components. The rim engaging member 76 is formed with two bends 80 and 82 proximate its distal end 84 to form a ramp portion 86 and an abutment portion 88. When the rim member 40 rotates to its second position, the rim member 40 will first engage the ramp portion 86 causing the rim engaging member 76 to bend in the direction of arrow 91 allowing the rim member 40 to slide up the ramp portion 86 until it passes the bend 82. At that point, the rim engaging member 76 will return to its pre-bent position. When a weight is applied to the rim 40 as when a fish is present in the net, the rim member 40 will rest upon the abutment portion 88 to hold the rim member 40 in its second position. To return the rim member 40 to its first position, the rim engaging member 76 can be manually bent in the direction of arrow 91 to allow the rim member 40 to be rotated passed the abutment portion 88.

Figures 4A, 4B:
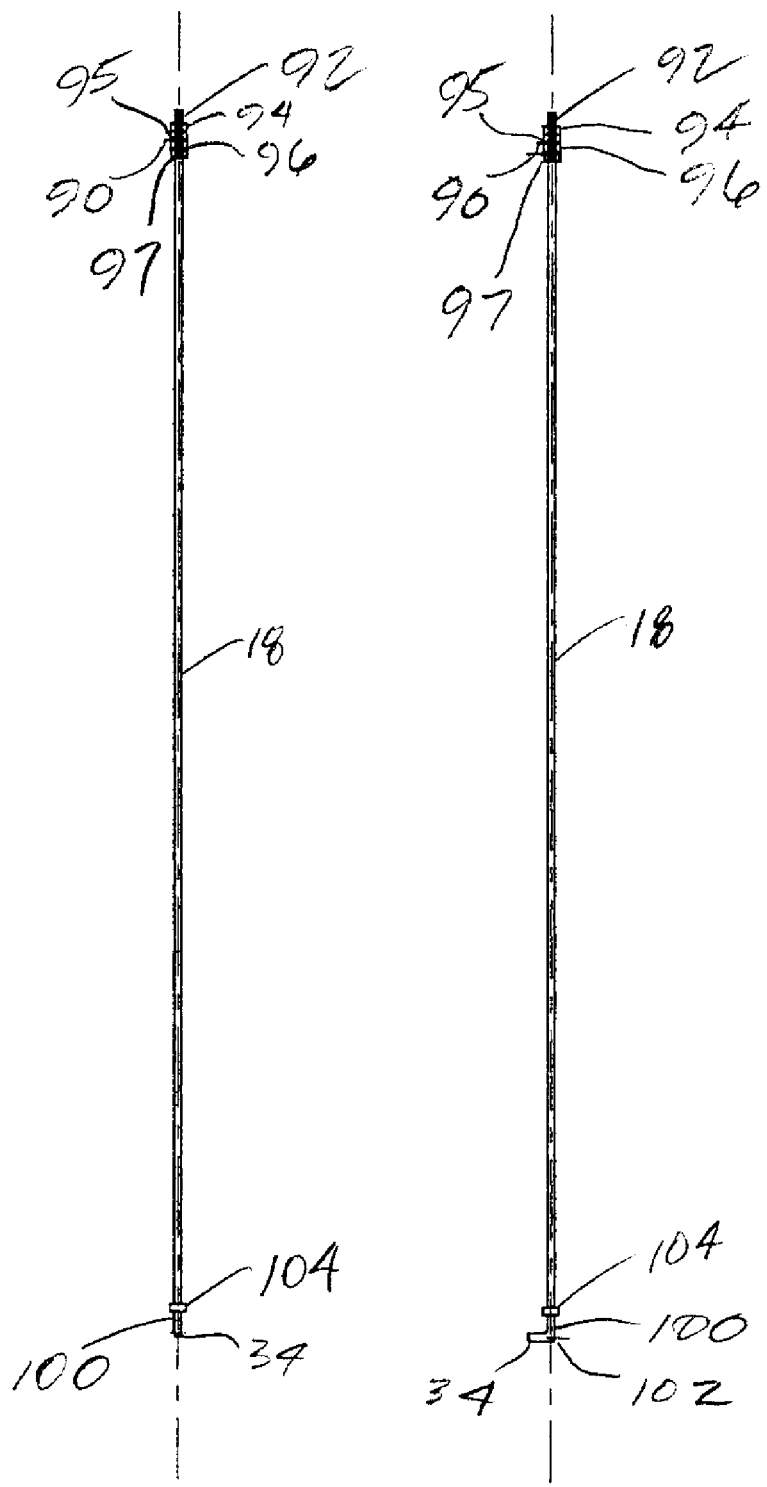
FIG. 4A is a front view of a rod used for releasing of the rim member when the rod is in a "release" position in accordance with the principles of the present invention.
FIG. 4B is a front view of the rod of FIG. 4B in a "ready" position to hold the rim member in a first position in accordance with the principles of the present invention.

FIGS. 4A and 4B illustrate the rod 18 which is configured to retain the rim member 40 when the rim member 40 is in a first or "loaded" position. The rod 18 extends from proximate the handle assembly to the net assembly through the handle 20 (see FIG. 1A). The rod 18 is held relative to the housing 32 with bracket member 90 secured to the wall 128 of the housing 32. The bracket 90 stabilizes the proximal end of the rod 18. The bracket 90 is secured relative to the rod 18 so as to substantially prevent vertical movement of the rod while allowing rotation of the rod 18 relative to the bracket. Such an attachment may be accomplished with threaded fasteners 94–97 threaded onto threads formed in the proximal end 92 of the rod 18. Those of skill in the art will appreciate that other means of fastening the bracket to the rod 18 while allowing rotation of the rod 18 relative thereto may also be employed. Proximate the distal end 100 of the rod 18, a bend 102 is formed in the rod 18 to form the release arm 34. A collar 104 is attached proximate the release arm 34 and is positioned within the tube 20 when the when the net is assembled. The collar 104 helps to longitudinally align the rod 18 within the tube 20 proximate the distal end 24 of the tube 20. Rotation of the bracket 90 causes rotation of the release arm 34 from a first position as shown in FIG. 4B where the release arm is able to hold the rim member 40 in its first position to a second position shown in FIG. 4A where the release arm 34 allows the rim member 40 to swing to its second position.

FIGS. 5A, 5B and 5C illustrate the release lever 16 as it is employed to rotate the rod 18 for releasing the rim member 40 (shown in FIG. 1A). The release lever 16 is pivotally attached to the housing 32. A first bracket member 110 is attached to the lever 16 and includes a first bore 112 there through for attached to a second bracket member 114 secured to the wall 116 of the housing 32. A pin or threaded fastener 118 secures the first bracket member 110 to the second bracket member 114 while allowing free rotation of the first bracket member 110 relative to the second bracket member 114. As shown in FIG. 5C, the release lever has a first portion 120 with an S-like configuration. This allows the proximal portion 122 which is configured for grasping by the angler to lie beneath the handle 26 so that the proximal portion 122 can be pulled toward the handle 26. The distal portion 124 extends upwardly from the first portion 120 for attachment of the bracket 90 as well as attachment of the to a rod pivoting member 130.

Figure 6:
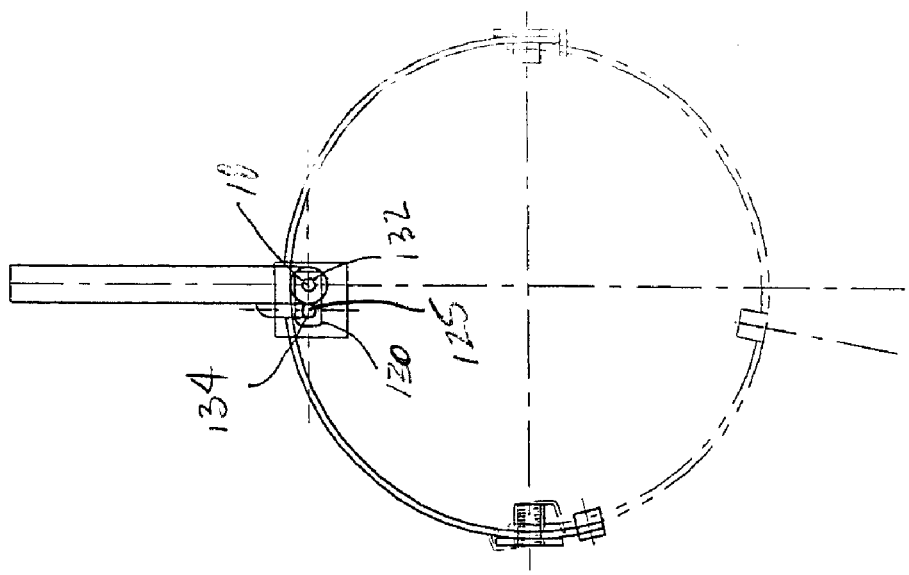
FIG. 6 is a top view of handle and rim assemblies in accordance with the principles of the present invention.

As better illustrated in FIG. 6, the rod pivoting member 130 has a rectangular or elongate configuration and includes a first bore 132 for being secured relative to the rod 18 and a second bore 134 for receiving the distal end 125 of the distal portion 124 of the release lever 16. Because the rod pivoting member 130 is fixedly mounted relative to the rod and pivotally attached proximate to the distal end 125 of the release lever 16, rotating the release lever toward the handle 26 will cause the distal end 125 of the release lever to move away from the handle 26. Such movement of the distal end 125 of the release lever 16 will thus cause the rod 18 to rotate resulting in rotation of the release arm 34 at the distal end of the rod 18 to allow the rim member 40 to swing from a first position to a second position as discussed herein. A biasing member 140 is coupled between the housing 32 and the release lever 16 so as to bias the release lever and thus the rod 18 to a position where the release arm 34 can engage with the rim member 40 to hold it in a first position.

To get the rim member 40 into a ready position (i.e., a first position) when the rim member 40 is already in its released or second position, the rim engaging member 76 is flexed away from the rim member 40 so that the rim member 40 can be rotated to its first position. The release lever 16 is then pulled toward the handle 26 so as to position the rim retaining member 52 for engagement with the arm 34. Releasing the lever 16 will cause the arm 34 to rotate to a position of engagement with the retaining member 52 and position the leg 70 beneath the handle 20. The net 10 can then be placed in an upright position to provide a free standing net 10 for use by an angler.

When a fish is caught by the angler and the angler can reel the fish into the ice hole, the angler can insert the net 10 with one hand into the ice hole 50 and hold on to the fishing pole with the other hand. Because the net 10 in a loaded state forms a crescent shaped net structure (i.e., the net and supporting structure lies against the wall of the ice hole along one side thereof) the net can be inserted into the ice hole 50 passed the fish without interfering with the fish or the fishing line. Once the net 36 and the rim 38 is below the fish, pulling the release lever or trigger will cause the second rim member 40 to quickly rotate to a second position and open the net 36 for receiving the fish therein. The ice fishing net 10 can then be lifted from the ice hole 50 with the fish safely secured therein.

Figures 7A, 7B:
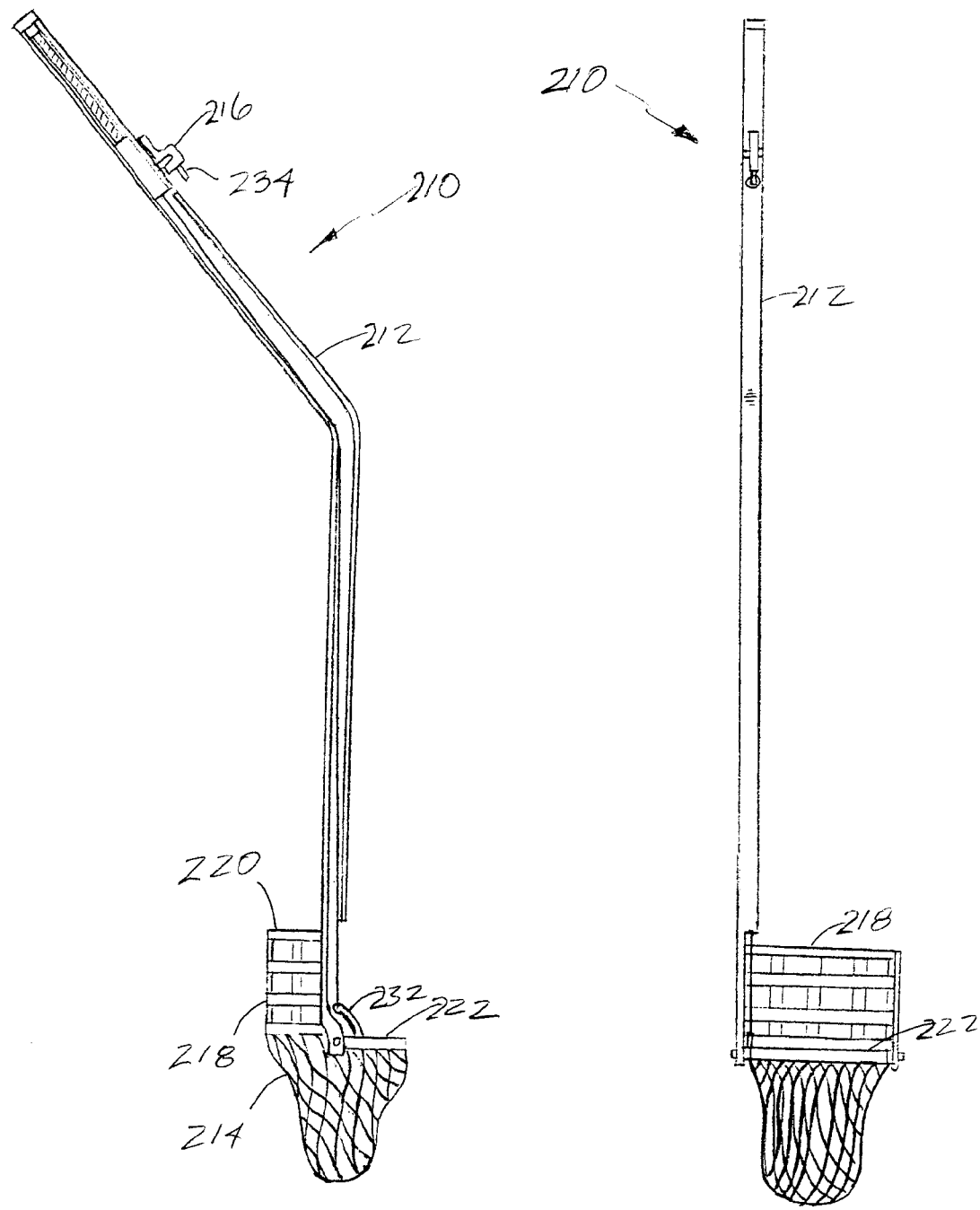
FIG. 7A is a side view of a second preferred embodiment of an ice fishing net with the net in a "released" position in accordance with the principles of the present invention.
FIG. 7B is a front view of the ice fishing net illustrated in FIG. 7A.

As shown in FIG. 7A, another preferred embodiment of an ice fishing net 210 is comprised of an angled elongate handle 212, shown in cross-section, having a net 214 secured to one end thereof and a net release mechanism 16 secured to the user end of the handle 212. The ice fishing net 210 shown in FIG. 7A is shown in a released state such that the net 214 is held open for receiving a fish therein. The net 214 is secured to a basket assembly 218 which includes a fixed basket portion 220 fixedly secured relative to the handle 212 and a pivotable basket portion 222. The pivotable basket portion can pivot relative to the distal end of the handle 212 from a first position where the pivotable portion 222 abuts against the fixed basket portion 220 to a second position to hold the net open as shown in FIG. 7A.

FIG. 7B illustrates a front view of the ice fishing net 210. The fixed basket portion forms a semi-cylindrical wall having a diameter that is slightly less than the ice hole for which the ice fishing net 210 is configured. Likewise, the pivotable basket portion 222 is comprised of an elongate member having a semicircular configuration to match the diameter of the ice hole. Thus, when combined with the fixed basket portion 220, the pivotable basket portion 222 in its released state as shown in FIGS. 7A and 7B form a circular opening sized to fit within a particularly sized ice hole.

Figure 8:
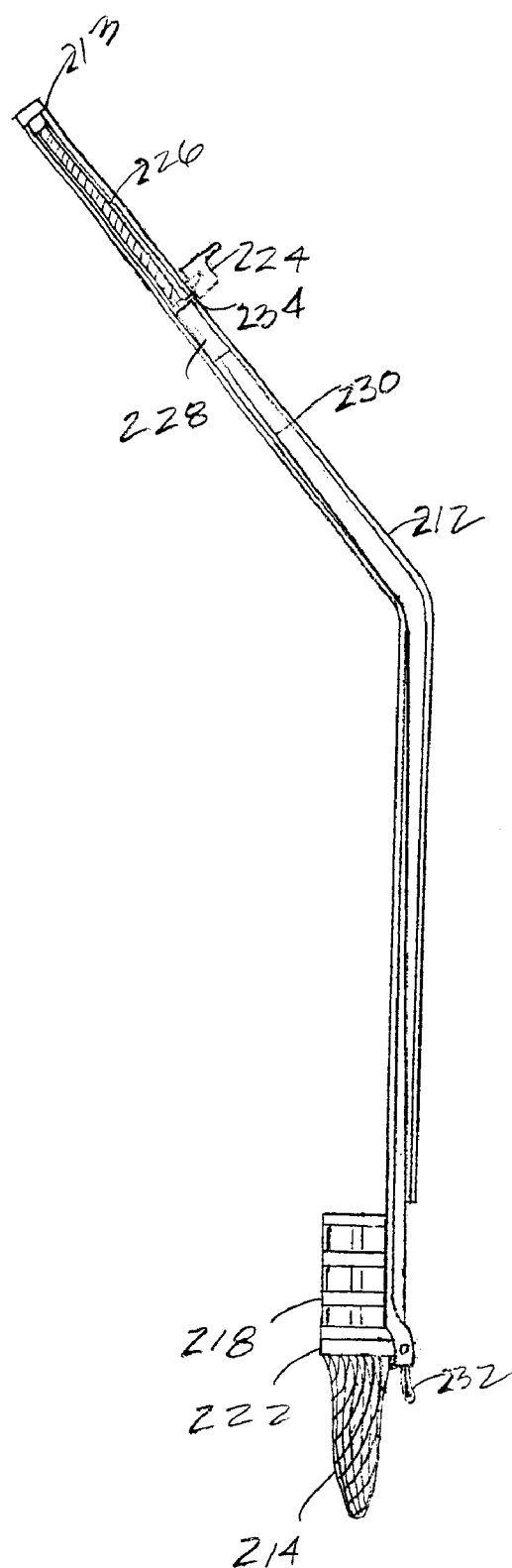
FIG. 8 is a side view of the ice fishing net illustrated in FIGS. 7A and 7B with the net in a "ready" position in accordance with the principles of the present invention.

Referring now to FIG. 8, the ice fishing net 210 is illustrated in a "ready" or unreleased state. The pivotable basket portion 222 has been rotated to abut against or be adjacent to the fixed basket portion 220. In this configuration, the net 214 is held in a closed position such that the net hangs in a substantially semicircular configuration below the basket portions 220 and 222. The handle 212 is comprised of a hollow tube to which the release mechanism 216 is attached. The release mechanism 216 is comprised of a trigger 224 having a retaining pin 234, a biasing member or spring 226 secured between the proximal end 213 of the handle 212 and a slidable release member 228 that is slidable within the handle 212. An elongate section of cable 230 is secured between the distal end of the slidable member and a small arm 232 secured to the rim of the pivotable basket portion 222 (see FIG. 7A). When set, the pin 217 holds the When the trigger 224 is rotated toward the proximal end 213 of the handle 212, a pin 234 retaining the slidable member disengages from the handle 212 and allows the slidable member to travel toward the proximal end 213 of the handle causing the cable 230 to pull the arm 232 and rotate the pivotable basket portion 222 to a closed position as shown in FIG. 7A.

In use, the ice fishing net 210 can be operated with one hand while holding a fishing pole in the other. When a fish is caught and brought within the hole, the basket assembly 218 as shown in FIG. 8 is inserted into the ice hole with one hand below the waters surface a sufficient amount to receive the fish attached to the hook of the fishing line. When the fish is positioned above the bottom of the basket portion 222, the trigger 224 is pulled and the basket portion 222 snaps closed to cause the net 214 to fill the ice hole as shown in FIG. 7A. The net 212 can then be raised to retrieve the fish from the ice hole.

While the ice fishing net of the present invention has been illustrated in certain preferred embodiments to illustrate what is believed to be the best mode of the invention, it is contemplated that upon review of the present invention, those of skill in the art will appreciate that various modifications and combinations may be made to the present embodiments without departing from the spirit and scope of the invention as recited in the claims. As such, the claims provided herein are intended to cover such modifications and combinations and all equivalents thereof. Therefore, reference herein to specific details of the illustrated embodiments is by way of example and not by way of limitation.

What is claimed is:

1. An fishing apparatus, comprising:

a handle;

a net assembly;

at least one elongate member coupled between said handle and net assembly, said net assembly comprising at least one rim portion pivotally mounted relative to said at least one elongate member, said at least one rim portion configured to pivot between a first position and a second position.

2. The fishing apparatus of claim 1, wherein said at least one rim portion further comprises a first rim portion and a second rim portion, said second rim portion being pivotally mounted relative to said at least one elongate member.

3. The fishing apparatus of claim 2, wherein said first rim portion is fixedly mounted relative to said elongate member and said second rim portion is pivotally mounted relative to said first rim portion.

4. The fishing apparatus of claim 1, wherein said net assembly comprises a net supported by said at least one rim portion.

5. The fishing apparatus of claim 2, wherein said second rim portion is biased to rotate from a first position to a second position.

6. The fishing apparatus of claim 5, further comprising a trigger assembly connected to said handle and linked to said second rim portion for holding said second rim portion in said first position and for selectively releasing said second rim portion to allow said second rim portion to rotate from said first position to said second position.

7. The fishing apparatus of claim 6, wherein said elongate member comprises an elongate tube and said trigger assembly comprises a release lever coupled to an elongate rod within said elongate tube, said rod having a proximal end coupled to said release lever for rotation of said rod and a distal end having a release arm for grasping said second rim portion when said second rim portion is in said first position.

8. The fishing net of claim 6, wherein said elongate member comprises an elongate tube and said trigger assembly comprises a biasing member coupled to a slidable member housed within said tube for biasing said slidable member toward said proximal end of said tube, a release pin for holding said slidable member away from said proximal end of said tube and for releasing said slidable member to allow said slidable member to slide toward said proximal end of said tube, and a cable coupled between said second rim portion and said slidable member, whereby movement of said slidable member toward said proximal end of said tube rotates said second rim portion to said second position.

9. The fishing apparatus of claim 2, wherein said first rim portion and said second rim portion have semicircular configurations having similar radii, said radii being less than a radius of an ice hole while substantially encircling an inside of said ice hole when said first and second rim portions are substantially perpendicular to said elongate member and lying against and encircling the inside of a portion of the wall of an ice hole when said rim portions are in said second position.

10. The fishing apparatus of claim 9, further including a rim retaining member depending therefrom positioned for engagement with said release arm when said second rim member is in said first position.

11. The fishing apparatus of claim 10, further including an abutment member fixedly secured relative to said first rim member to prevent over rotation of said second rim member when said second rim member swings from said first position to said second position.

12. The fishing apparatus of claim 11, further including a rim engaging member for holding said second rim member in said second position.

13. The fishing apparatus of claim 2, further including a spring coupled to said second rim member for forcing said second rim member from said first position to said second position.

14. The fishing apparatus of claim 2, wherein said net assembly includes a first frame member and a second frame member, said second rim portion being pivotally mounted to and between said first frame member and said second frame member.

15. An ice fishing net, comprising:

a handle;

an elongate member having a proximal end coupled to said handle and a distal end;

a net rim assembly attached to said elongate member proximate said distal end thereof, said net rim including first and second semicircular rim portions, said second rim portion rotatably mounted relative to said elongate member, said second rim portion rotatable from a first position to a second position to form a substantially circular rim in said second position.

16. The ice fishing net of claim 15, further including first and second upright frame members coupled to said net rim assembly, each positioned on opposite sides of said net rim assembly and spaced from said elongate member, said second rim portion being rotatably coupled relative to said first and second upright frame members.

17. The ice fishing net of claim 15, further including a trigger assembly coupled relative to said elongate member for allowing said second rim member to rotate from said first position to aid second position.

18. The ice fishing net of claim 15, wherein said net rim assembly further includes a netting material secured relative to said first and second rim portions for forming a net for receiving a fish therein when said second rim member is in said second position.

19. The ice fishing net of claim 15, further including a biasing device associated with said second rim member for biasing said second rim member from said first position to said second position.

20. The fishing apparatus of claim 15, wherein said first rim portion and said second rim portion have semicircular configurations having similar radii, said radii being less than a radius of an ice hole while substantially encircling an inside of said ice hole when said first and second rim portions are substantially perpendicular to said elongate member and lying against and encircling the inside of a portion of the wall of an ice hole when said rim portions are in said second position.

* * * * *